3,344,602
FUEL PURGING SYSTEM FOR GAS TURBINE ENGINES
David Omri Davies, Kingsway, Derby, and Alan Parker, Ockbrook, England, assignors to Rolls-Royce Limited, Derby, England, a British company
Filed Nov. 18, 1965, Ser. No. 508,433
Claims priority, application Great Britain, Dec. 12, 1964, 50,665/64
4 Claims. (Cl. 60—39.28)

ABSTRACT OF THE DISCLOSURE

A fuel purging system for a gas turbine engine having a reservoir supplied with air under pressure from an engine compressor through a non-return valve which closes when the compressor delivery pressure falls below that in the reservoir. The reservoir communicates with fuel lines for the engine through a second non-return valve which opens when the pressure in the reservoir exceeds that in the fuel lines.

Brief description of invention

The present invention relates to a gas turbine engine and has particular application to systems for supplying an inflammable liquid or gas, such as liquid or gaseous fuel to such an engine.

According to the invention, there is provided a gas turbine engine including a conduit, means for supplying said conduit with fuel under pressure, a vessel, a pressure responsive valve communicating with the vessel and with said conduit, and means for supplying the vessel with pressurized air, the pressure responsive valve being adapted to allow the passage of air from the vessel to the conduit only when the pressure of the fuel in the conduit is less than the pressure of the air in the vessel by a predetermined amount.

In a preferred embodiment air which has been compressed by the engine compressor is fed to the vessel and the vessel preferably incorporates means for regulating the pressure therein.

The engine may be mounted for use as a vertical lift engine in a vertical take-off and landing aircraft and/or for propulsion of the aircraft.

Figure 1:
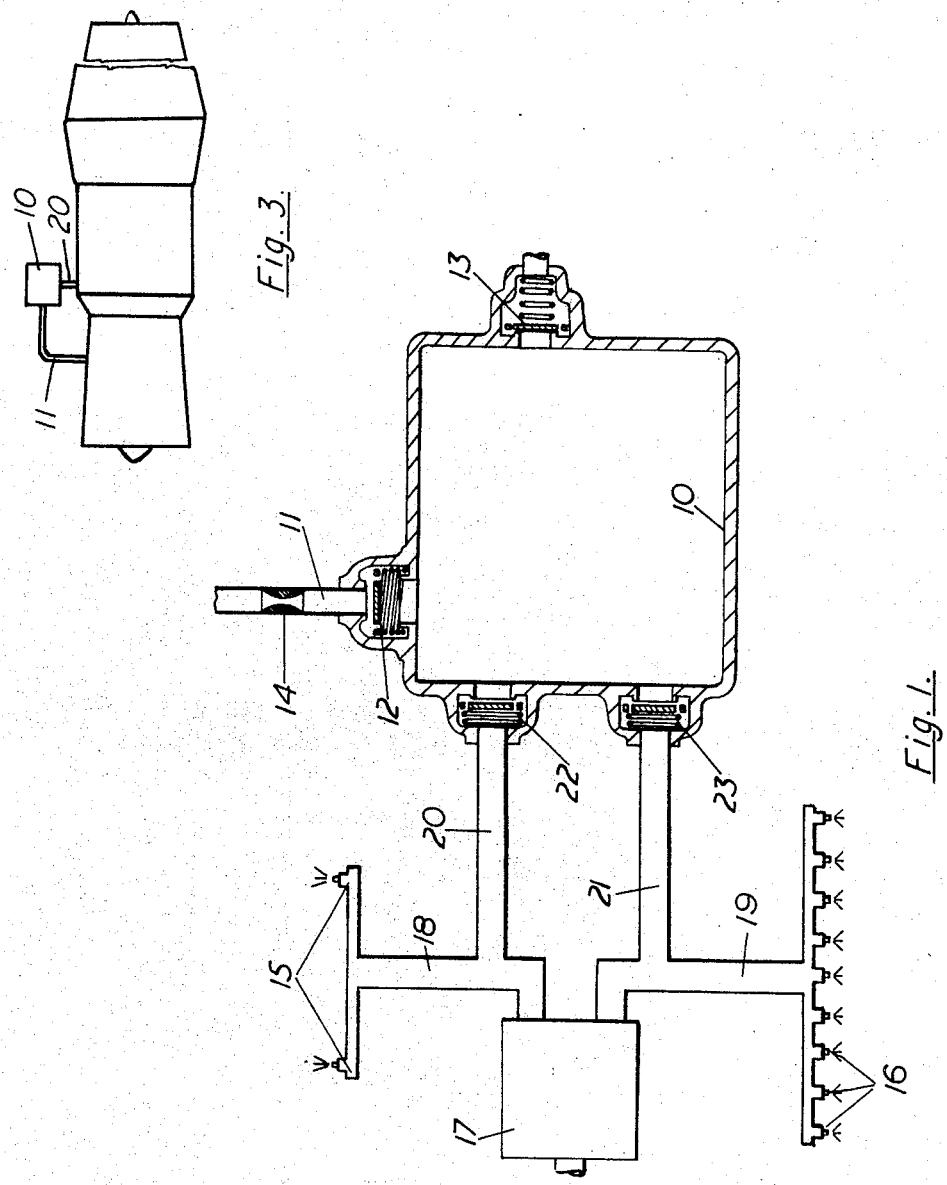
Figure 2:
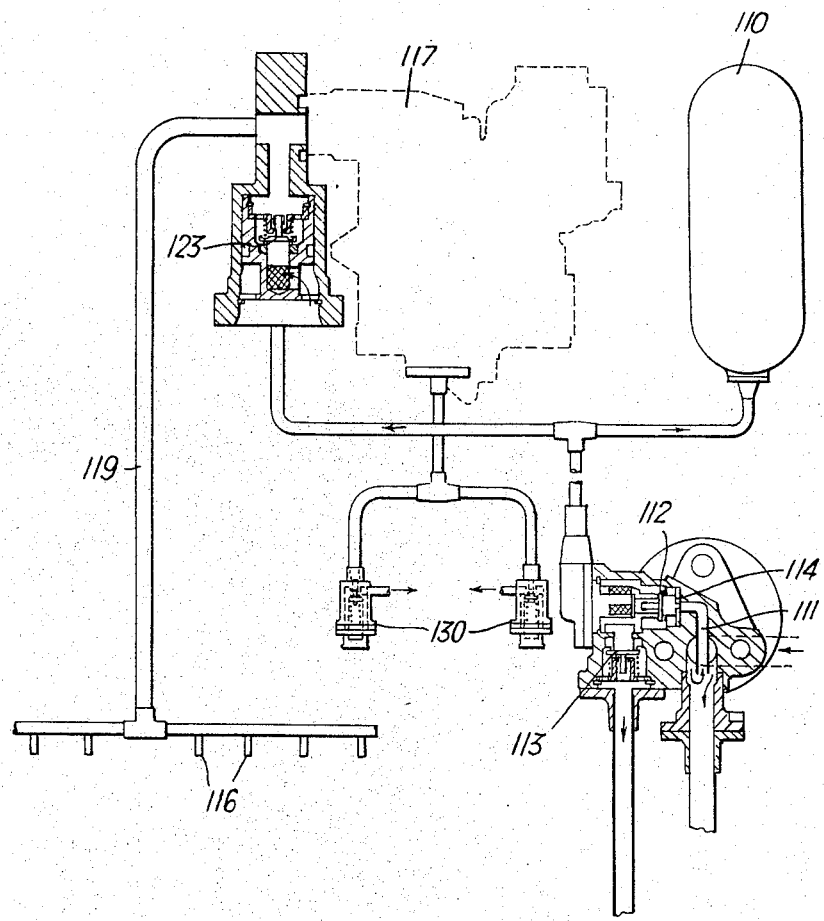

Embodiments of the invention, given by way of example only will now be described with reference to the accompanying drawings, in which:

FIGURE 1 shows schematically one arrangement of the present invention for use in conjunction with a gas turbine engine, FIGURE 2 shows an alternative embodiment of the invention, and FIGURE 3 shows a gas turbine engine embodying the invention of FIGURE 1 or FIGURE 2.

Detailed description of invention

FIGURE 1 shows an air reservoir 10 which is adapted to be connected to a bleed from the compressor (not shown) of a gas turbine engine via a tube 11 and a non-return valve 12. The valve 12 is maintained open, during normal operation of the system by the pressure of the incoming compressed air, and the pressure in the reservoir 10 is maintained by a regulating valve 13. The tube 11 incorporates a restriction 14 to throttle the floor of air therethrough, so that the flow of air bled from the compressor is limited. The possibility of dirt reaching either the valve 12 or the valve 13 and hindering their operation is made small by the provision of an air filter (not shown) upstream of restrictor 14.

Fuel is supplied to the primary burners 15 and secondary burners 16 in the combustor or combustion zones of the engine from a fuel source (not shown) and via the fuel supply and regulation system 17. The primary fuel supply conduit 18 and the secondary fuel supply conduit 19 are respectively provided with branches 20, 21 which communicate with the air reservoir 10 through non-return valves 22, 23 respectively.

During the normal operation of the engine, the pressure of fuel which is maintained, in known manner, by a fuel control system, in conduits 18, 19 and in branches 20, 21 is sufficient to maintain valves 22, 23 closed against the air pressure within reservoir 10. However, when the fuel pressure falls to below a selected low pressure, due to engine shut-down or failure, the valves 22, 23 open under the fuel-air pressure difference between reservoir 10 and branches 20, 21, and air can then enter the branches 20, 21 and the conduits 18, 19 to expel the fuel remaining therein through the burners 15, 16.

The time required for thus expelling the residual fuel is considerably shorter than that which would otherwise elapse between engine shut-down and the emptying of branches 20, 21 and tubes 18, 19 due to dribbling of the fuel from the burners 15, 16. During this shorter period, the decelerating compressor and turbine are still "wind-milling" and there is sufficient air flow through the engine to discharge the expelled fuel from the combustion zones of the engine.

After the excess pressure of the air in vessel 10 relative to the pressure in the fuel lines has been discharged, the valves 22, 23 close automatically under the action of their return springs and the vessel 10 is then ready to be recharged with air for further use.

By means of the invention, the possibility is reduced or avoided of fuel which remains in conduits 18, 19 and branches 20, 21 dribbling out of the burners 15, 16 and accumulating in the hot combustion chamber and jet-pipe following engine shut-down where it could constitute a considerable fire-hazard, either immediately after shut-down or when the engine is re-started. The pressure and volume of air in the reservoir 10 are arranged to be sufficiently high to cause the residual fuel to be forcibly expelled in a comparatively short time, while the pressure of the air in the reservoir is arranged to be sufficiently low to be available even during idling of the engine. The regulating valve 13 serves as an outlet from the vessel and is adapted to open at pressures above a selected pressure of the air in the vessel 10.

In the case where the pressure outside the burners 15, 16 is normally substantially the same as the pressure of air supplied to vessel 10, so that the pressure of fuel in the lines leading to the burners 15, 16 is normally higher than the pressurre in the vessel 10 to accommodate pressure losses in the lines, it may be possible to dispense with regulating valve 13. This case may be met in gas turbine engines when the air bleed from the compressor to vessel 10 is taken downstream of the compressor, adjacent the burners of the combustion chamber. Following engine shut-down, the fuel pressure from the engine driven pump and the compressor delivery pressurre both decay, and in due course, the pressure drop across valves 22, 23 is sufficient to enable air to enter branches 20, 21 and tubes 18, 19 thereby to expel the residual fuel.

In a practical embodiment of the fuel system according to the invention for use in conjunction with a gas turbine, residual fuel was expelled after engine shut-down within 1.5 seconds.

The invention is also applicable to systems for supplying gaseous fuel to an engine, such as a gas turbine engine.

FIGURE 2 illustrates a further embodiment of the invention which is applicable when the length of the fuel lines between the throttle unit and the pilot burner is small, and shows a modified arrangement of valves.

Its mode of operation is similar to the first embodiment.

When the engine is running the pressure of the air from the compressor is much less than the fuel pressure. Air from the compressor (not shown) passes down a delivery pipe 111 through a restriction 114 and through a non-return valve 112, which is arranged to open at very low pressure, and charges a vessel 110.

A throttle unit 117 supplies fuel to a conduit 119 and from there to main fuel burners 116.

Fuel pressure, however, prevents the passage of the air through the non return valve 123.

A further non return valve 113 is arranged to open when the vessel 110 is charged to its maximum pressure and dump excess air from the compressor overboard.

When the throttle is shut or the fuel pressure decays due to any other cause the air pressure in the vessel soon overcomes the decaying fuel pressure and opens the non-return valve 123. This allows the air from the vessel 110 to pass along the conduit 119 and push out all the fuel therein through the main fuel burners 116.

In this embodiment it is not necessary to have the air vessel connected to the pilot burner lines and simple check valves 130 arranged to close by spring pressure when the fuel pressure decays are sufficient.

FIGURE 3 shows a gas turbine engine 1 to which the above described invention is applied.

We claim:

1. A system for purging fuel conduits in a gas turbine engine having a combustor, fuel burners for said combustor and a first conduit for supplying a fuel under pressure to the burners, comprising:

a reservoir for containing air under pressure, a second conduit for supplying air under pressure to said reservoir, said second conduit being in communication with a compressor of the gas turbine engine so as to receive compressed air from the compressor for delivery to the reservoir, said compressor also supplying air to said combustor, a first pressure responsive valve controlling fluid flow between said first conduit and said reservoir, said first pressure responsive valve being closed during normal operation of the gas turbine engine when the pressure in said first conduit exceeds that of said reservoir but being opened to allow passage of air from said reservoir to said first conduit only when the pressure of fuel in the first conduit is less than the pressure of air in the reservoir by a predetermined amount, and a second pressure responsive valve controlling fluid flow between said second conduit and said reservoir, said second pressure responsive valve being open during normal operation of the gas turbine engine only when the pressure in said second conduit exceeds that of said reservoir but being closed when the pressure of air in said second conduit.

2. A gas turbine engine according to claim 1 and including a pressure regulating means in communication with said reservoir for regulating the maximum pressure of the air in the reservoir.

3. A gas turbine engine according to claim 1 and in which said fuel burners comprise main burners and pilot burners, said first conduit supplying fuel under pressure to the main burners, and further including:

a third conduit for supplying fuel under pressure to said pilot burners, and a third pressure responsive valve controlling fluid flow between said reservoir and the third conduit, said third pressure responsive valve being closed during normal operation of the engine when the pressure in said third conduit exceeds that of said reservoir but being opened when the pressure in the reservoir exceeds the pressure in the third conduit by a predetermined amount.

4. A gas turbine engine according to claim 2 wherein said pressure regulating means comprises a valve which is adapted to open to allow air to escape from the reservoir when the pressure of the air in the reservoir exceeds a predetermined value.

References Cited

UNITED STATES PATENTS

| | | | |
|---|---|---|---|
| 752,195 | 2/1904 | Best | 158—75 |
| 2,056,568 | 10/1936 | Davis. | |
| 2,818,110 | 12/1957 | Rulseh | 158—36 |

JULIUS E. WEST, *Primary Examiner.*